United States Patent
Bakas

(10) Patent No.: US 6,247,658 B1
(45) Date of Patent: Jun. 19, 2001

(54) STOWABLE WASHER FOR VEHICLE UNDERCARRIAGE

(76) Inventor: John Bakas, 1130 Larkin St., Apt. 5, San Francisco, CA (US) 96109-5782

(*) Notice: Subject to any disclaimer, the term of this patent is extended or adjusted under 35 U.S.C. 154(b) by 0 days.

(21) Appl. No.: 09/549,500

(22) Filed: Apr. 14, 2000

Related U.S. Application Data

(60) Provisional application No. 60/129,458, filed on Apr. 15, 1999.

(51) Int. Cl.[7] .................................................. B05B 3/00
(52) U.S. Cl. ..................... 239/722; 239/754; 239/280; 239/532; 134/123
(58) Field of Search ........................... 239/722, 754, 239/526, 532, 588, 280; 134/123

(56) References Cited

U.S. PATENT DOCUMENTS

| | | | |
|---|---|---|---|
| 4,580,726 | 4/1986 | Unger | 239/286 |
| 4,899,940 | 2/1990 | Leaver | 239/526 |
| 4,984,746 | 1/1991 | Joyal | 239/722 |
| 5,820,037 | * 10/1998 | Lawrence | 239/722 |
| 6,045,064 | * 4/2000 | Abraham | 239/722 |

* cited by examiner

*Primary Examiner*—Lisa Ann Douglas
(74) *Attorney, Agent, or Firm*—Flehr Hohbach Test Albritton & Herbert LLP; Walter H. Dreger; Michael A. Kaufman

(57) ABSTRACT

A stowable device for washing the underside and wheel well regions of a vehicle includes a base member joined at one end to a handle member such that the angle between the members can vary. A water jet disposed adjacent the distal end of the base member has a slit-like outlet. A length of flexible tubing couples the water jet to a trigger handle and waterjet valve located on the free end of the handle member. A source of water is coupled to the trigger handle, and passes through the flexible tubing and out the waterjet when the user presses the water jet valve. At least one non-swivelling wheel assembly is attached to the base member. The ratio between the length of the base member and the width of the wheel assembly preferably exceeds about 20:1 to promote maneuverability of the device.

20 Claims, 2 Drawing Sheets

STOWABLE WASHER FOR VEHICLE UNDERCARRIAGE

RELATION TO PENDING APPLICATION

Applicant claims priority from his U.S. provisional patent application entitled "Car Bottom Washer", Ser. No. 60/129,458, filed Apr. 15 1999.

FIELD OF THE INVENTION

The invention relates generally to devices to clean accumulated gunk and debris from wheel wells and the undercarriage of motor vehicles, and more particularly to such a device that is sufficiently portable to be stowed in a vehicle trunk, and can be maneuvered and used even in freezing weather.

BACKGROUND OF THE INVENTION

The undercarriage (or underside) and especially the wheel well regions-of motor vehicles accumulate much gunk and debris during the normal course of driving. Vehicles that are operated in regions of snow are especially vulnerable to accumulating gunk that includes salt, used by highway departments in an attempt to improve road conditions during freezing conditions. Unless such gunk is removed periodically, rusting of the undercarriage and wheel well regions will occur. General Motors, for example, recommends that the undercarriage and wheel well regions of its vehicles be cleaned periodically. In addition to presenting a potential for rusting, portions of road gunk may work into bearing regions on the vehicle wheels, where further damage if not danger can result.

U.S. Pat. No. 4,984,746 to Joyal (1991) discloses a device to remove such gunk from the undercarriage. Joyal provides a very stable three-wheeled base member shaped like a "T" that has a plurality of upward facing steerable water jets. A handle member is fixedly attached to the broad end of the base member. Water from a hose is coupled through a handle valve, through the handle member, through a tube in the base member and out the jets. Twisting the handle apparently rotates the water jets.

Unfortunately Joyal's device appears to be rather cumbersome for use in removing debris from behind a tire in a wheel well because it is typically necessary to lift the cleaning device and aim the water output by the device behind the wheel. Joyal's steerable water jets make it difficult for a user who cannot see the jets to know precisely where they are aimed at a given moment. Joyal provides upwardly directed mirrors on the base member to provide some visual guidance, but in practice such mirrors would soon be covered Joyal's device seems impractical to use during winter, the season when such devices are most needed. For example, when cleaning a vehicle undercarriage, gunk freed by the water spray will fall from the undercarriage onto the device. During freezing weather, this gunk can freeze to the device within a few seconds. As a result, Joyal's steerable water jets and their associated internal gearing would soon be frozen into a fixed orientation due to the presence of freezing gunk falling onto the device. Further, Joyal's device is literally too wide and too stable to be readily tipped sideways and tapped against the ground to remove gunk falling onto the device, which gunk will freeze to the device if not quickly removed.

Although multiple water jets may at first appear to be a desirable feature, but when a user partially withdraws Joyal's device from beneath a vehicle, e.g., perhaps in a backward and forward cleaning motion, the water jet nearest the handle will squirt water into the air and perhaps onto the user. While such a water spray might be delightful in summer, in winter it is unacceptable because it will freeze the user's clothing. Understandable, as the number of water jets increases, the force of the water output from a given jet will decrease, yet when cleaning an undercarriage or a wheel well, maximum water force is desired. Finally, Joyal's device is not stowable in the sense that he provides no mechanism to collapse the device to a form factor sufficiently compact to fit within the trunk of a motor vehicle. Such stowability is desired, especially in winter, as the undercarriage cleaning device will always be available if it is always carried in the vehicle to be cleaned.

U.S. Pat. No. 4,580,726 to Unger (1985) discloses a car under-washing device that, like Joyal, mounts upward facing water jets on a very stable base member that can be wheeled under a vehicle. The jets are mounted on a "T"-shaped tube within the base member, which generally resembles a flat vacuum cleaner head. A handle assembly attaches flexibly to the base member, and the water jets can be steered by twisting the handle. A water hose attaches to the handle portion, which provides a continuous fluid channel through the "T"-shaped tube and delivers water via the jets to the underside of a motor vehicle.

Unger's device appears to suffer many of the shortcomings noted above with respect to Joyal's device. The stability provided by the base member perhaps works well for washing the underside of a vehicle, but renders the overall device ungainly when trying to get behind a tire to clean a wheel well. Gunk and other debris falling downward from the vehicle underside will soon jam the steerable water jets, especially in freezing temperature, and if the base member is pulled too far out from beneath a vehicle, the user will be sprayed with water from the rear-most jet. Finally, Unger's device requires "knocking-down" or dismantling and does not lend itself to be stowed in a vehicle trunk for use without first reassembling the device.

U.S. Pat. No. 4,899,940 to Leaver (1990) discloses a vehicle washing device comprising a single water carrying tube having a dog-leg like appearance. The distal region of the tube is curved and contains several water jets, with the free distal end being capped. One end of the distal region joins a bend tube region that merges angularly into a straight tube region that interfaces with an angled straight tube region, whose free end has a handle and valve for receiving water from a hose or the like. Leaver's device is designed to wash all portions of a vehicle, from the roof to the underside. A significant feature of Leaver's device is said to be a mini-steering wheel like circle located near the handle region, to permit a user to grasp and rotate the device.

Leaver's device has several shortcomings. The relative angle between the water jet carrying tube region and the handle region is permanently fixed, no doubt for ease in washing the roof of a motor vehicle. However this inflexibility would work a hardship on a user attempting to clean the undercarriage of a vehicle in that much stooping and bending would be required to reach all regions. That the device is primarily intended for roof washing is suggested by the absence of any wheels on the bottom of the device, and by the relatively short-appearing length of the horizontal portion of the device. The absence of wheels means that a user attempting to clean the undercarriage of a vehicle would either allow the bottom of the device to scrape along the ground, or would have to manually support the device an inch or so above ground. Allowing the device to scrape the ground would of course soon wear a hole through the tubing, producing a water leak. On the other hand, manually supporting the device would soon exhaust the user attempting to clean the undercarriage of a vehicle. The presence of multiple water jets creates a risk that the user will be sprayed with water, an intolerable happenstance during winter. Finally, Leaver's device must be disassembled for stowing, yet after winter use the component parts might literally be frozen together, preventing immediate disassembly.

In short, although devices to clean the underside of a motor vehicle are known, such devices have shortcomings. There is a need for a simple and lightweight device that can be used to access and clean the undercarriage and wheel well regions of a motor vehicle, and whose construction permits stowing the device within the vehicle trunk. The device should be sufficiently lightweight and maneuverable to access and clean behind a tire in a wheel well region, as well as regions of the undercarriage of a vehicle. Preferably few waterjets should be provided so as to maximize water flow from each jet. Further, no water jets should be provided distant from the distal end of such a device, to guard against spraying a user with water during winter, when the device is moved away from the underside of a vehicle.

The present invention provides such a device.

SUMMARY OF THE INVENTION

The invention comprises a hinged-together "L"-shaped frame comprising a narrow elongated base member whose distal end has a water outlet jet, and whose other end is hingedly joined to a preferably narrow elongated handle member. The base member includes at least one, preferably non-swiveling, wheel, located on the ground-facing side near the distal end, and preferably includes a single slit-opening water outlet jet. The angle $\phi$ between base and handle members may change freely as the device is invention is used, or the angle may be locked by the user.

To promote maneuverability in use, especially in cleaning wheel well regions, the ratio of the length (L1) of the base member to the wheel width (W2) is at least 20:1, and preferably at least 30:1. This large L1:W2 ratio intentionally promotes instability in placing the base member, which in turn promotes maneuverability, especially in wheel well regions behind a tire. Further, the large L1:W2 ratio tends to make the overall device light in weight, further promoting maneuverability and ease of use, and also provides an intuitive sense of where the water jet is pointing, even if it cannot be seen. The length L2 of the handle member is preferably less than about 2 L1, and more preferably about equal to L1, to promote easy storage of the device when not in use. In a stowed disposition, the base member and the handle member are folded parallel to each other such that the overall stowed length of the device is about L1.

A flexible plastic tubing is connected at one end to the water outlet jet, and is connected at the other end to a garden hose-type trigger valve preferably located on a pistol-like handle on the free end of the handle member. In use, the trigger valve may be coupled with a garden hose to a source of water, including water provided by a water pump. Detergent, antifreeze chemicals and the like may be added to the water that passes through the plastic tubing and through the outlet jet.

Other features and advantages of the invention will appear from the following description in which the preferred embodiments have been set forth in detail, in conjunction with the accompanying drawings.

DETAILED DESCRIPTION OF THE PREFERRED EMBODIMENT

Figure 1:
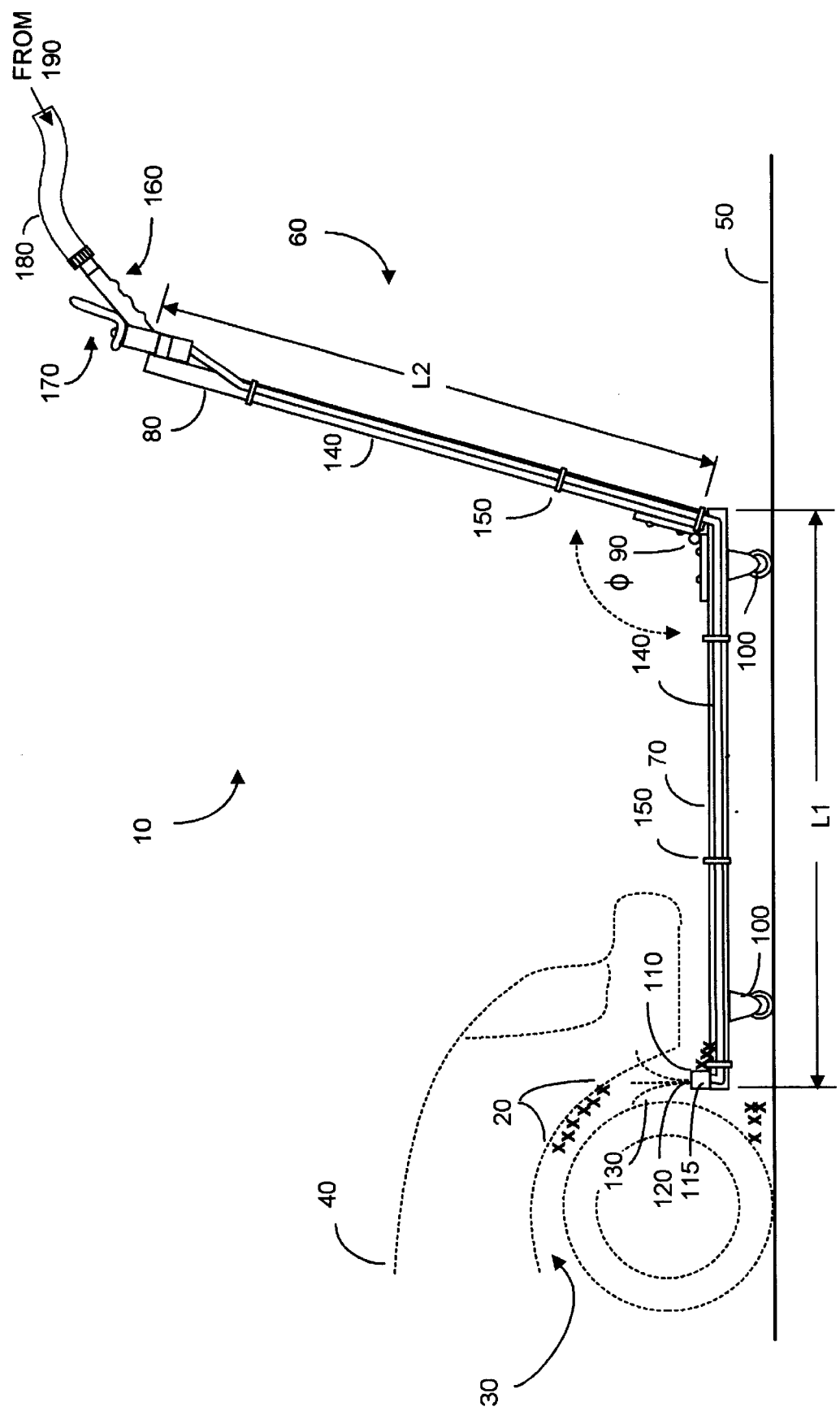
FIG. 1 is a side view showing the present invention in use.

FIG. 1 depicts a device 10 according to the present invention used to remove debris 20 (also shown as "x") from the underside or undercarriage or wheel well region 30 of a vehicle, shown in phantom as 40. In FIG. 1, both the vehicle and the present invention are shown referenced to the ground 50.

Device 10 includes a generally "L"-shaped frame 60 that comprises a preferably narrow elongated base member 70, and a preferably narrow elongated handle member 80, wherein members 70 and 80 are joined together at one end by a mechanism 90. Mechanism 90, which may be a common hinge or pivot, permits a user to rotate members 80 and 90 relative to one another through an angle $\phi$ that can range from essentially 0° to essentially 180°, if desired. In use, as shown in FIG. 1, a more common value of $\phi$ is perhaps 120° to 150°. A maximum value of $\phi$ can be provided automatically simply by the abutment between the lower end of handle member 80 and the hinge-end of base member 70 if the hinge-like mechanism 90 is intentionally mounted such that the lower end of member 80 will contact the upper surface of the hinge-end of member 70. A desired maximum angle $\phi$ can be created by cutting the lower end of member 80 at an angle other than 90° relative to the longitudinal axis of member 80.

One advantage of the present invention is that it is readily stowable in the trunk or other storage area of a vehicle, simply by rotating members 70 and 80 together such that $\phi$ is about 0°. The preferred embodiment allows hinge-like mechanism 90 to operate freely during use of device 10, e.g., allowing the user vary angle $\phi$ as the device is rolled forward and backward. However, a user-operable mechanism 240 could be provided to lock angle $\phi$ at some user desired value, perhaps 110°. Mechanism 240 could operate frictionally, or could include a side bracket with a crescent-shaped groove adapted to receive a projecting lug from one or both of members 70 and 80. The design of angle-locking mechanisms 240 is well known in the mechanical arts, and therefore no details are provided herein.

Figure 2:
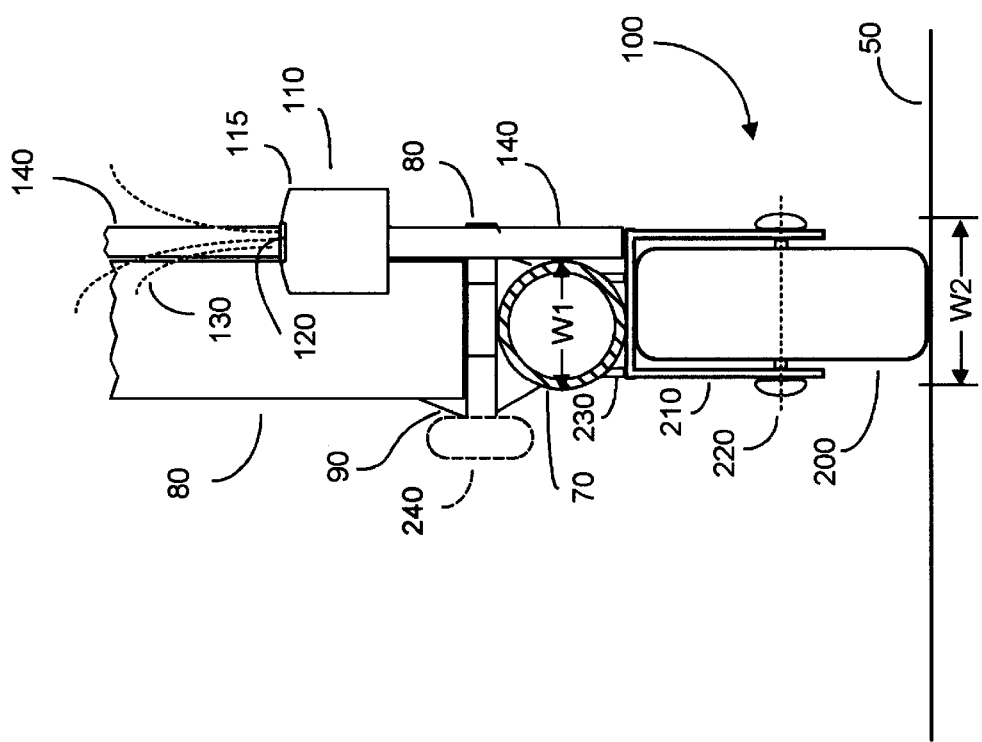
FIG. 2 is a front view of the embodiment of FIG. 1.
Figure 1:
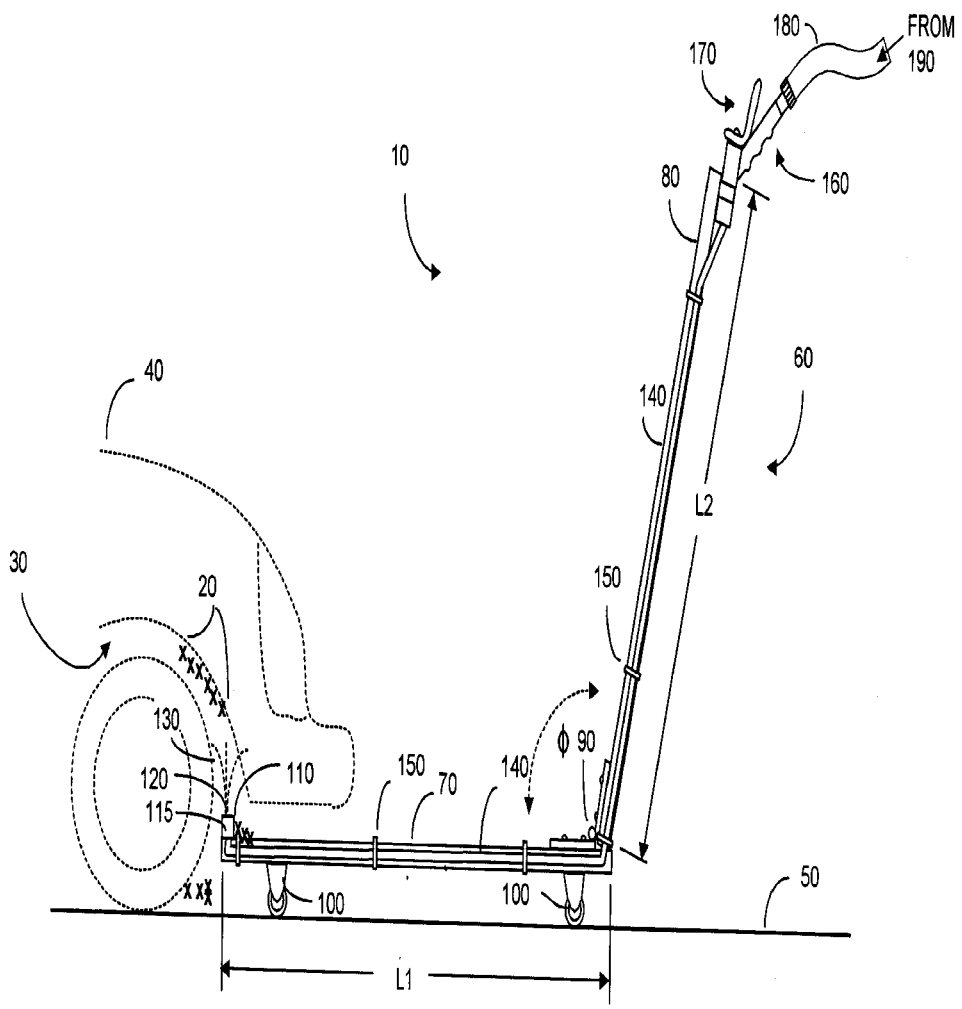
Figure 2:
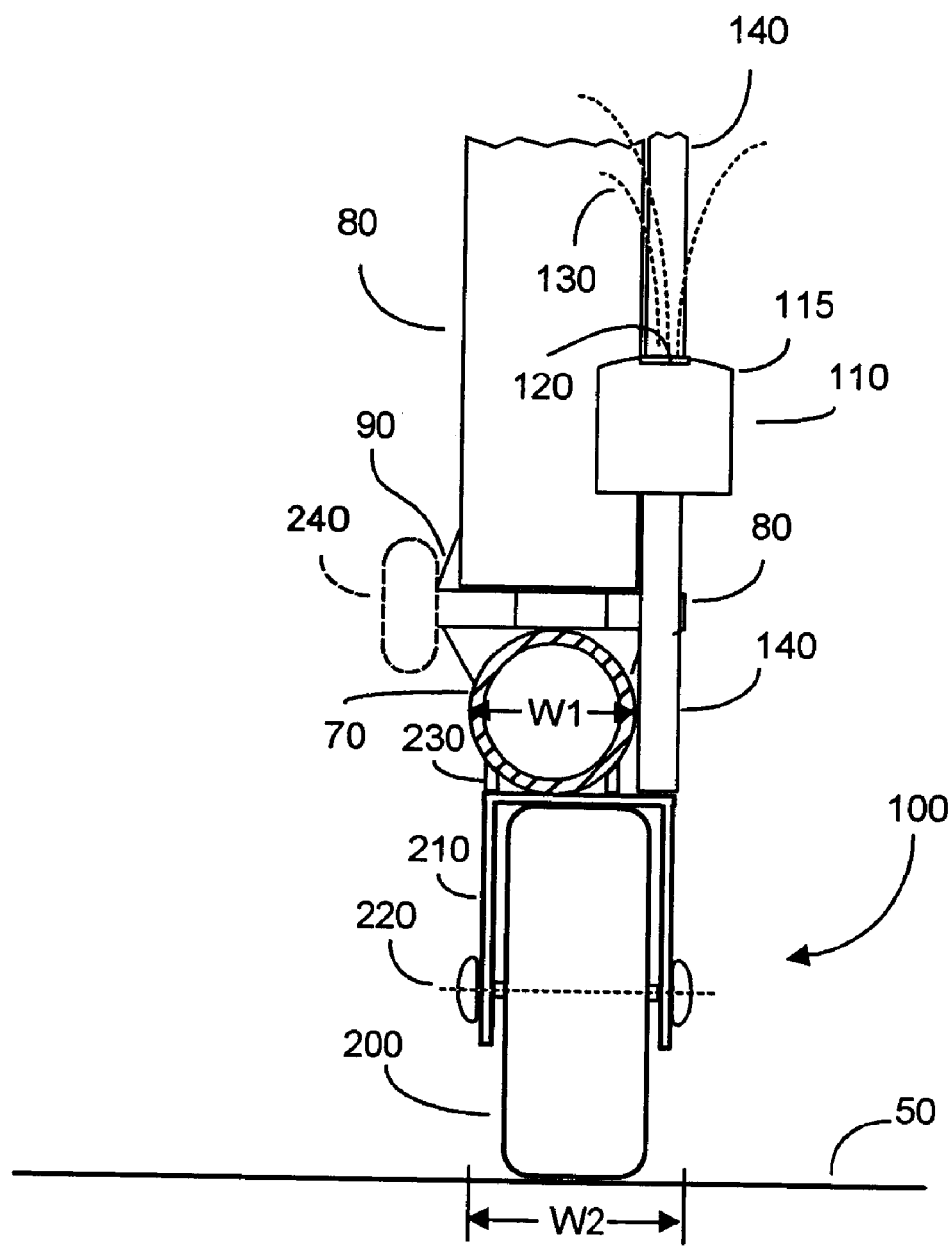

At least one and preferably two wheel assemblies 100 are mounted to member 70 to permit a user to roll device 10 in a backward and forward motion on the ground or other surface 50. Further details of the wheel assemblies are shown in FIG. 2.

A water outlet jet 110 is mounted on or adjacent the distal tip portion of base member 70. Referring still to FIG. 1, the upwardly facing surface of jet 110 includes a water outlet opening, preferably in the shape of a single slit 110, from which a forceful outflow of water 130 will be emitted. A length of preferably flexible plastic tubing 140 is secured to members 70 and 80, e.g., by clamps 150, tape, or similar mechanisms. One end of tubing 140 is coupled to water outlet jet 110 at the distal region of base member 70 via a 90° angled plastic coupler 250. Tubing 140 has an outside diameter of perhaps 0.625", although other sizes and types of tubing could instead be used. One end of coupler 250 preferably fits within the end of tubing 140, and the other end of coupler 250 has threads to which outlet jet 110 may be attached.

In the preferred embodiment, outlet jet 110 is a threaded so-called end cap 115, formed of hollow plastic having an outer diameter of perhaps 1.25" and a threaded inner diameter of about 0.75". A single slit-like opening 120 is formed through the top surface of jet 110. In the preferred embodiment, opening 120 is a single slit having length about 0.25" and width perhaps 0.06". In the preferred embodiment, the long side of slit 120 is oriented perpendicular to the longitudinal axis of bottom member 70. This orientation has been found to produce excellent results. However, it is possible for a user to vary orientation of the slit-like opening during use simply by rotating water outlet jet 110 relative to the right angle member 250. Slits or indeed other shaped openings with different dimensions could instead be formed, using forming techniques well known in the relevant art.

The other end of tubing 140 is coupled to a preferably pistol handle-like mechanism 160, which includes a water trigger valve mechanism, shown as 170. A garden hose or the like 180 may be attached to a threaded connector on handle-like mechanism 160, thus coupling device 10 to a source of water 190. The water source may be a spigot on a dwelling water supply, or may be from a water pump that can augment the pressure of water delivered to device 10. If desired, a detergent, antifreeze chemicals, or the like may be added to the incoming water delivered to device 10. The nature of trigger valve mechanism 170 is such that when a user squeezes the mechanism, water from hose 180 flows through plastic tubing 140, through the outlet jet 110 and out of opening 120 as spray 130, to clean debris 20 from the underside and/or wheel well regions of vehicle 40. Trigger valve mechanisms 170 that incorporate a locking feature to reduce user hand fatigue are preferred, and are well known in the relevant art. Angled plastic coupler 250, end cap 115 used to form outlet jet 110, tubing 140, handle mechanism 160 and valve-jet mechanism 170 are all readily available from hardware or garden stores.

In practice, base member 70 and handle member 80 are each a length of inexpensive and lightweight material, for example commonly available PVC-type plastic pipe, such as is sold at hardware and garden stores. In the preferred embodiment, members 70 and 80 have an outer diameter W1 (see FIG. 2) of perhaps 1" and an inner diameter of perhaps 0.75". In the preferred embodiment, the length L1 of base member 70 is at least 24" and preferably about 36", although shorter or longer values for L1 could be used. A device 10 intended for use on large trucks, construction vehicles and the like might have length L1 as great as at least 60". For ease of storage, it is preferred that the L2 of handle member 80 preferably be about the same as L1, although L2≦2 L1 would still readily fit in most vehicle trunks. In general, it is preferred that a ratio L1:W1 exceed about 20:1, and more preferably exceed about 30:1. This intentionally long but narrow configuration for the base member, and preferably for the base member and the handle member, promotes ease of maneuverability of device 10, especially when trying to remove debris from behind a tire in a wheel region.

FIG. 2 provides further details as to device 10. Each wheel assembly 100 includes a wheel 200 retained within an attachment bracket 210 for rotation freely about a wheel axis 220. Bracket 210 is also used to attach wheel assembly 100 to base member 70, for example with a clamp, screws, or other mounting mechanism 230. In contrast to prior art undercarriage cleaning devices, in the present invention the wheel assemblies cannot themselves rotate relative to base member 70. Thus, as a user wheels device 10 along ground 50, the wheel assemblies only permit a backward and forward wheel motion, but not a swivel motion. In the preferred embodiment, two wheel assemblies 100 are used, each having a single wheel 200 whose diameter is about 2" and whose wheel thickness W2 is about 0.875". Overall width W3 of the wheel assembly is about 1.25". Such wheel assemblies are commonly available from hardware stores.

Note that the ratio between L1 and W2 is greater than about 24:1 and preferably is about 36:1. This large ratio admittedly makes the present device somewhat unstable with respect to maintaining a constant angle θ between the plane of the ground 50 and the longitudinal axis of handle member 80. However such instability is desired because it promotes maneuverability, especially with respect to rotating the device almost parallel to the ground (e.g., small angle θ) and lifting the device, for example to reach behind a tire in a wheel well to remove debris and gunk.

At first blush, providing device 10 with non-swiveling wheel assemblies may appear to be disadvantageous. However as indicated in FIG. 1, freed debris and gunk 20 ("X") and copious amounts of sprayed water will fall from the undersurfaces of vehicle 40, and can land on device 10 and on ground 50. This debris and gunk will be somewhat slushy in texture, and in winter temperatures can rapidly freeze onto device 10. Thus, in winter use, a wheel assembly that swivelled could freeze in an orientation in which the wheels were perhaps at right angles to the longitudinal axis of base member 70. By providing non-swiveling wheel assemblies, the present invention ensures that even in winter climate, wheels 200 will always align with the longitudinal axis of base member 70. When it is desired to cause the distal end of base member 70 to sweep in an arc, it is only necessary for the user to pull slightly backward on handle mechanism 160. This will raise the distal tip of base member 70 and any wheel assembly thereunder, and pivot device 10 about the region where members 70 and 80 join.

Note too that in contrast to prior art cleaning devices, the present invention intentionally provides a single water outlet jet 110, located adjacent a distal portion of base member 70. Understandably, the force of water spray 130 emitted from a single outlet jet 120 can be substantially greater than if a plurality of such jets were provided. Further, having a single jet at the distal region of base member 70 advantageously protects the device user from being sprayed as the device is rolled backwards, out from under a vehicle. In FIG. 1, for example, if a second water outlet jet were located on base member 70 near the hinge-like joining mechanism 90, a user could easily become sprayed with water. Understandably in the cold of winter, such spraying is not acceptable, however prior art devices with their plurality of outlet jets can all too readily spray the user with water that will shortly freeze to the user's clothing. Further, the simplicity of the single outlet jet 110 renders the jet less likely to become clogged with falling and freezing debris 20 during winter use, in contrast to prior art devices with steerable outlet jets.

In summation, it is seen that the present invention overcomes all of the shortcomings noted in prior art devices. The preferred embodiment weighs less than three pounds and can be fabricated for less than $20, using off-the-shelf generic components. There are no complicated gears and steerable water jets or castor swivel wheel units to become frozen and jammed during winter use. There are no rear-located water jets to inadvertently spray the user during use. The base and handle members may pivot or hinge freely during use (e.g., allowing angle φ to vary), yet the overall device is sufficiently rigid to give the user an excellent intuitive sense of where the water jet is aimed at any given moment, even when not in direct sight. Finally, the device may be folded in half (e.g., φ≈0°) and stowed within seconds, with no disassembly of the device required. If a hinge or pivot locking mechanism 250 is provided, the device may also be used to wash the roof of vehicles including hard to reach recreational vehicle roofs.

Modifications and variations may be made to the disclosed embodiments without departing from the subject and spirit of the invention as defined by the following claims.

For example, although the preferred embodiments have been described with respect to having plastic members, those skilled in the art will appreciate that, where applicable, fiber glass, composite, aluminum or other light weight tubing material might instead be used.

What is claimed is:

1. A stowable device for washing the underside and wheel well regions of a vehicle, comprising:

a base member having a first distal end, a second distal end, a length L1, and a width W1, wherein L1>10W1;

a water jet disposed adjacent said first distal end of said base member;

a handle member having a first handle end and a second handle end and a handle member length L2 equal to at least about 0.5L1, said first handle end joined to said second end of said base member to permit angular movement therebetween, to form a generally "L"-shaped structure during use, and to permit stowing said device without dismantling said device;

a pivot element having width W2 disposed on an undersurface of said base member adjacent said second end thereof, wherein L1>10W2;

a handle affixed to said second handle end;

a water trigger valve, affixed to said second handle end and adapted to receive a source of water; and a length of flexible tubing having a first end coupled to said water jet, and having a second end coupled to said water trigger valve;

said handle member, said base member, and said pivot element being configured such that a downward directed force on said handle will pivot said device about said pivot element including moving said water jet upward and closer to said underside or wheel well regions of said vehicle during cleaning.

2. The device of claim 1, wherein a ratio of said L1:W1 exceeds about 20:1.

3. The device of claim 1, wherein said pivot element includes a first wheel assembly mounted to an underside of said base member.

4. The device of claim 1, wherein said pivot element includes a first wheel assembly mounted to an underside of said base member, wherein said assembly includes a wheel having said width W2;

wherein a ratio of said L1:W2 exceeds about 20:1.

5. The device of claim 3, wherein said first wheel assembly is non-swivelling relative to said base member.

6. The device of claim 1, wherein said water jet defines a slit-shaped water outlet.

7. The device of claim 1, wherein said base member and said handle member are joined with a mechanism selected from a group consisting of (a) a hinge mechanism, and (b) a pivot mechanism.

8. The device of claim 1, further including a user-lockable hinge, joining said second end of said base member and said first handle end at a user-defined angle therebetween.

9. The device of claim 1, further including means for retaining said second end of said base member and said first handle end at a user-selected angle therebetween.

10. The device of claim 1, wherein 24"$\leq$L1$\leq$60", and 0.5"$\leq$W$\leq$1.5".

11. The device of claim 1, wherein in a stowed disposition, said base member and said handle member are hinged to lie adjacent to and parallel to one another, wherein overall stow length of said device is approximately said L1.

12. The device of claim 1, wherein at least one of said base member and said handle member are fabricated from plastic pipe.

13. A stowable device for washing the underside and wheel well regions of a vehicle, comprising:

a hinged-together "L"-shaped frame, said frame comprising a base member portion having a length L1, a width W, and a ratio L1:W exceeding about 20:1, and a handle member portion having a length L2 equal to at least about 0.5 L1, said hinged-together frame permitting said device to be stowed without dismantling;

at least one wheel assembly, having width W1, fixedly and non-swivally attached to an undersurface of said base member adjacent a hinged-together portion thereof, wherein W1$\leq$2W;

a water jet disposed adjacent a distal end of said base member portion; and means for coupling a source of water to said water jet;

said "L"-shaped frame and said wheel assembly configured such that movement of said handle member portion pivots said device about said wheel assembly including causing said water jet to move upward and closer to said underside or wheel well regions of said vehicle during cleaning.

14. The device of claim 13, further including a trigger valve, mounted adjacent a non-hinged end of said handle member portion.

15. The device of claim 13, wherein said waterjet defines a slit-shaped water outlet.

16. The device of claim 13, further including a user-lockable hinge, joining said base member portion to said handle member portion at a desired angle therebetween.

17. The device of claim 13, further including means for hingedly retaining said base member portion to said handle member portion with a userselected angle therebetween.

18. A stowable device for washing the underside and wheel well regions of a vehicle, comprising:

an "L"-shaped frame including a base member portion joined to a handle member portion so as to permit angular movement therebetween and to permit stowing said device without dismantling, said base member portion having a length L1, a width W, and a ratio L1:W exceeding about 20:1, and said handle member portion having a length L2, wherein L2$\leq$1.5 L1;

at least one wheel assembly, having width W1, fixedly and non-swivally attached to said base member, wherein W1$\leq$2W;

a water jet disposed adjacent a distal end of said base member portion; and means for coupling a source of water to said water jet;

said handle member portion, said base member portion, and said wheel assembly being configured such that a downward directed force on said handle assembly will pivot said device about said wheel assembly including moving said water jet upward and closer to said underside or wheel well regions of said vehicle during cleaning.

19. The device of claim 18, further including a trigger valve, mounted adjacent a non-hinged end of said handle member portion.

20. The device of claim 18, wherein said waterjet defines a slit-shaped water outlet.

* * * * *

UNITED STATES PATENT AND TRADEMARK OFFICE
CERTIFICATE OF CORRECTION

PATENT NO.    : 6,247,658 B1
DATED         : June 19, 2001
INVENTOR(S)   : John Bakas It is certified that error appears in the above-identified patent and that said Letters Patent is hereby corrected as shown below:

<u>Title page,</u>
Item [76], Inventor: change zip code from "96109-5782" to -- 94109-5782 --.

<u>Drawings,</u>
Please substitute the drawings filed with Applicant's Amendment dated January 11, 2001 (copy of drawings attached) for the drawings published in the patent.

<u>Column 1,</u>
Line 11, change "generallyto" to -- generally to --.
Line 20, change "regions-of" to -- regions of --.
Line 52, insert a -- . -- after "covered".

<u>Column 3,</u>
Line 33, delete "device is".

<u>Column 4,</u>
Line 33, after "user" insert -- to --.

<u>Column 5,</u>
Line 41, before "L2" insert -- length --.

Signed and Sealed this

Twenty-sixth Day of November, 2002

*Attest:*

*Attesting Officer*

JAMES E. ROGAN
*Director of the United States Patent and Trademark Office*